(12) United States Patent
Parazak et al.

(10) Patent No.: US 6,214,100 B1
(45) Date of Patent: Apr. 10, 2001

(54) INK-JET PRINTING INKS CONTAINING ESTER MODIFIED MACROMOLECULAR CHROMOPHORES

(75) Inventors: Dennis P Parazak, Corvallis, OR (US); Ronald J Gambale, Wakefield; Robert M Amici, Berlin, both of MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/430,532

(22) Filed: Oct. 29, 1999

Related U.S. Application Data

(60) Provisional application No. 60/140,290, filed on Jun. 18, 1999.

(51) Int. Cl.[7] .............................. C09D 11/02; C09C 1/48
(52) U.S. Cl. .................. 106/31.6; 106/31.85; 106/472; 106/473; 106/476; 106/478; 106/499; 106/505
(58) Field of Search ............................. 106/31.6, 31.85, 106/472, 473, 476, 478, 499, 505

(56) References Cited

U.S. PATENT DOCUMENTS

| | | | |
|---|---|---|---|
| 5,707,432 | 1/1998 | Adams et al. | 106/31.6 |
| 5,803,959 * | 9/1998 | Johnson et al. | 106/31.75 |
| 5,837,045 * | 11/1998 | Johnson et al. | 106/31.85 |
| 5,851,280 * | 12/1998 | Belmont et al. | 106/472 |
| 5,922,118 | 7/1999 | Johnson et al. | 106/31.6 |
| 6,069,190 * | 5/2000 | Bates et al. | 523/161 |

FOREIGN PATENT DOCUMENTS

| | | | |
|---|---|---|---|
| 0913 438A1 | 5/1999 | (EP) | C09D/11/00 |
| 0688836B1 | 9/1999 | (EP) | C09D/11/02 |
| 2 323 600A | 9/1998 | (GB) | C09C/1/56 |
| WO 97/47697 | 12/1997 | (WO) | C09D/11/00 |
| WO 97/48769 | 12/1997 | (WO) | C09B/67/22 |

\* cited by examiner

Primary Examiner—Helene Klemanski
(74) Attorney, Agent, or Firm—Michael D. Jones

(57) ABSTRACT

The ink of the invention comprises a vehicle and a macromolecular chromophore colorant. The colorant is a water-insoluble pigment that has been chemically modified to be water dispersible by addition of functional groups to the surface of the pigment resulting in water dispersible colorant particles. The performance of these pigments is improved by the addition of specific functional groups which provide improved black to color bleed control and high waterfastness.

12 Claims, No Drawings

INK-JET PRINTING INKS CONTAINING ESTER MODIFIED MACROMOLECULAR CHROMOPHORES

CROSS REFERENCE TO RELATED APPLICATIONS

This patent application claims back to provisionally filed U.S. patent application Ser. No. 60/140,290, filed Jun. 18, 1999.

TECHNICAL FIELD

The present invention relates to ink-jet compositions for inkjet printers, including thermal inkjet, piezoelectric inkjet, drop on demand, and continuous printing applications for home, office, large format printers, and textile printers. The inks herein comprise pigments that have been chemically modified to be water dispersible by addition of functional groups to the surface of the pigment, resulting in water dispersible macromolecular chromophore particles. The performance of these macromolecular chromophores is improved by the addition of specific ester functional groups that provide improved black to color bleed control and high waterfastness.

BACKGROUND ART

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Inks useful in ink-jet printing are typically composed of either pigments or dyes. Pigments are very small insoluble solid colorant particles wherein the molecules are strongly associated with one another through intermolecular forces such as Van der Waals attraction, pi-pi interactions or hydrogen bonding. These forces of attraction prevent solvation of the molecules by common solvents such that they cannot form solutions like their dye counterparts. Conventionally, pigments are used in printing inks by suspending them in a liquid medium using a high-energy dispersion process with the aid of dispersing agents. One disadvantage of using pigments is that their dispersions are inherently thermodynamically unstable and eventually the pigment particles agglomerate to larger particles that tend to settle. Moreover, pigments lead to the inks taking a relatively long time to dry on the media, which in turn leads to increased opportunity for the ink to run or smear when subjected to moisture or water; the degree of water resistance is called "waterfastness". Further, the tendency of one color of ink to run into the adjacent color is know at "bleed". This is most apparent with black ink bleeding into color inks. Several methods have been employed by ink formulators to achieve bleed control to varying degrees of success. Many pigmented inks possess one or more of the foregoing properties. However, few ink compositions possess all of those properties, since an improvement in one property often results in the degradation of another. Thus, inks used commercially represent a compromise in an attempt to achieve a pigmented ink evidencing at least an adequate dispersibility and performance in each of the aforementioned properties.

Accordingly, investigations continue into developing ink formulations that have both good dispersibility and improved properties such as improved bleed control and good waterfastness all without sacrificing performance in other necessary properties.

DISCLOSURE OF INVENTION

In accordance with the invention, inks used in ink-jet printing are provided wherein the black to color bleed and water resistance of the inks are improved through the use of an ink which contains at least one colorant where the colorant comprises pigment particles (preferably carbon black), wherein the surface has been treated with a combination of dispersing groups and specific ester functional groups. This modified pigment particle is also known as a "macromolecular chromophore" or (MMC). This treatment results in water-dispersibility and improved print properties of the pigmented-based ink.

Additionally, methods of ink-jet printing that use the disclosed inks and exploits the ink's properties are provided.

In the practice of the present invention, specific functional groups are applied to a colorant particle with a useful mean diameter ranging from 0.005 to 10 μm. If the colorant particles are larger than this, they do not remain in solution well enough to be useful in the practice of this invention. Likewise, if the colorant particles are too small, they lack the appropriate properties to be useful in this invention. Colorants of this type result from chemical reactions where the colorant particles are derivatized with solubilizing groups that render the colorant dispersible in water. This resulting functionalized pigment, or MMC, is water-dispersible, with stability being similar to that of well known and commercially used water-soluble acidic and basic dyes.

Examples of water-dispersible black chromophores (or pigments) suitable for use herein are made from commercially available pigments obtained from colorant vendors such as Cabot Corp. Although many base pigments are useful in the practice of this invention, the following pigments comprise a partial list of useful base colorants in this invention; however, this listing is not intended to limit the invention. Base Cabot pigments would include Monarch® 1400, Monarch® 1300, Monarch® 1100, Monarch® 1000, Monarch® 900, Monarch® 880, Monarch® 800, and Monarch® 700, Cab-O-Jet® 200 and Cab-O-Jet® 300. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S 170, Special Black 6, Special Black 5, Special Black 4A, Special Black 4, Printex U, Printex 140U, Printex V, and Printex 140V. Tipure® R-101 is available from DuPont.

Ester Functional Groups

The ester structure that imparts bleed control and water-fastness benefits is:

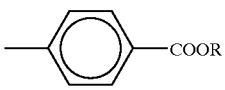

R can be from about 2 to about 4 carbons. R can be branched or unbranched. Preferred R groups include ethyl, n-propyl, isopropyl, n-butyl, isobutyl and t-butyl.

Functional Groups Imparting Water-dispersibility

For modification, one preferred method is treatment of the carbon black pigment with aryl diazonium salts prepared from aromatic compounds containing the carboxylate functional groups. Examples of aryl diazonium salts include those prepared from aminoisophthalic acid.

The base pigments are modified by the addition of one or more organic compounds of the structure:

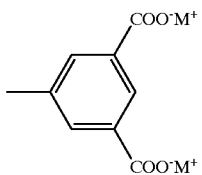

wherein $M^+$ can be $Na^+$, $Li^+$, $K^+$, $NH_4^+$, tetramethylammonium (($CH_3$)$_4$N+), and trimethylammonium (($CH_3$)$_3$NH$^+$) cations, although any suitable counterion may be used herein.

Synthesis

Although any method known to those skilled in the art can be used to attach these functional groups, one method herein begins with a ratio of water-dispersible group reactants to ester group reactants at treatment levels of from about 0.3/0.5 to about 0.5/0.3 mmol/g macromolecular chromophore (MMC). One preferred ratio of water-dispersible reactants to ester-based, bleed control reactants is a ratio of 0.5:0.5 mmol/g MMC. Another preferred ratio is 0.3:0.3 mmol/g MMC. In general, see U.S. Pat. Nos. 5,707,432; 5,630,868; 5,571,311; and 5,554,739 for a discussion of modified carbon black pigments and methods of attaching functionalized groups. The final ratio of functional groups on the pigment is based on these starting ratios and completion of the reaction themselves.

Ink Formulation

The ink compositions of this invention comprise the modified macromolecular chromophore above plus a vehicle. For a discussion of inks and their properties, see *The Printing Manual,* 5th ed. Leach et al. (Chapman and Hall, 1993). See also U.S. Pat. Nos. 2,833,736; 3,607,813; 4,104,061; 4,770,706; and 5,026,755.

A typical formulation for an ink useful in the practice of the invention includes the functionalized pigment (about 0.001% to 10 wt %), one or more cosolvents (0.01 to about 50 wt %) and one or more water-soluble surfactants/amphiphiles (0 to about 40 wt %, preferably about 0.1 to about 5%).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, lactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from about 0.01 to about 50 wt %, with about 0.1 to 20 wt % being preferred.

Water-soluble surfactants may be employed in the formulation of the vehicle of the ink. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; POE amides; and dimethicone copolyols. Ionic surfactants such as quaternary or protonated amines or POE amines, sulfonates, carboxylates, phosphates, phosphonates, sulfates and substituted amine oxides are useful in the practice of this invention. U.S. Pat. No. 5,106,416, discloses more fully most of the surfactants listed above. The non-ionic amphiphiles/surfactants are more preferred than the ionic surfactants. Specific examples of amphiphilies/surfactants that are preferably employed in the practice of this invention include SURFYNOL 465, Rhodacal N, Pluronic F65, Pluronic F38 and cocobetaine. The concentration of the amphiphile/surfactants may range from 0 to 40 wt %, preferably from about 0.1% to 5 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Ucarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the pigment colorants disclosed herein. For ink formulations which employ pigments having carboxylate functionalities, the pH is from about 7 to about 12. The viscosity of the final ink composition is from about 0.8 to about 8 cps, preferably from about 0.9 to about 4 cps.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing include paper, textiles, wood, and plastic.

The inks are formulated by combining the various components of the vehicle and mixing them with the treated pigments disclosed herein.

All concentrations herein are expressed in weight percentages, unless otherwise indicated. The purity of all components is that employed in normal commercial practice for ink-jet inks. All cited documents and patents are hereby incorporated by reference.

PRINT SAMPLE GENERATION METHOD. Print samples of formulated inks are generated using a Hewlett-Packard DeskJet® printer. The print media includes plain paper such as Gilbert Bond, Champion Datacopy, Papyrus Multicopy and Union Camp Jamestown.

WATERFASTNESS MEASUREMENT. A series of 12 parallel black lines approximately 0.1 inch wide and 0.2 inches apart are printed on a page which is then mounted on a 45-degree incline. A 0.25-mL aliquot of water is dripped at the specified time after printing from the top of the first line across all 12 lines. Waterfastness is measured by measuring the OD between the 11th and 12th lines. OD is measured using a MacBeth densitometer.

BLEED MEASUREMENT. Black lines approximately 0.1 inch wide and flanked by adjacent yellow boxes are printed with a yellow ink. The black-color bleed is ranked using a scoring system of >8–10 (very poor), 6–8 (poor), 4–6 (moderate), 2–4 (good), 1–3 (very good) and 0–1 (excellent).

EXAMPLES

Black inks are prepared containing 3% of the specified modified pigment having a surface area of 200 $m^2/g$ and a DBP absorption value of 122 ml/100 g (Cabot Monarch® 700 pigment). The vehicle consisted of 5% Liponics EG-1 (ethoxylated glycerol), 9% 2-pyrrolidinone, 2% 1,5-pentanediol and the balance is water. The pH is adjusted with KOH to 8–9.

Various yellow inks are used to assess black to color bleed. A typical color ink vehicle consists of 7.5% 2-pyrrolidone, 8% 1,5-pentanediol, 7.5% ethylhydroxypropanediol (EHPD), 7% citric acid, 1.75% Tergitol 15-S-7, 4% β-alanine, Na-Direct Yellow 132 dye (Abs=0.12 at 1:10,000 dilution), and the balance water. This results in an ink that is buffered at pH 4.

Example I

The following example describes the preparation of a modified carbon black pigment with 0.3 mmoles/g 5-aminoisophthalic acid (ISO) and 0.3 mmoles/g butyl 4-aminobenzoate (BAB).

Carbon black having a surface area of 200 $m^2/g$ and a DBP absorption value of 122 ml/100 g (300 g) is added to a batch pin mixer heated to 70° C. To this is added 5-amino isophthalic acid (17.16 g). Mixing is started, and an aqueous solution of sodium nitrite (6.21 g dissolved in 107.3 g water) is added while mixing. Total mixing time is approximately 5 minutes. The mixing is then stopped, and butyl 4-aminobenzoate (17.57 g) is added. Mixing is started again, and a solution of nitric acid (8.1 g 70% nitric acid dissolved in 107.3 g water) is added while mixing. The mixing time is 4 minutes. Finally, an aqueous solution of sodium nitrite (6.21 g dissolved in 107.3 g water) is added while mixing for 5 minutes. The mixing is stopped, and the material is removed from the batch pin mixer and allowed to cool to room temperature. This is then redispersed in water at 15% solids, pH adjusted to approximately 8.5 with sodium hydroxide and microfiltered to 0.5 microns.

Other modified carbon black pigments are prepared utilizing the procedure set forth above, except that the amount of treating agents is varied as indicated in the Examples.

Example II

Black inks were prepared containing the pigments shown in the following table:

| Pigment | Abbreviation |
| --- | --- |
| 0.5 mmol/g isophthalic acid/0.5 mmol/g p-ethylbenzoate | 0.5 ISO/0.5 EB |
| 0.5 mmol/g isophthalic acid/0.3 mmol/g p-ethylbenzoate | 0.5 ISO/0.3 EB |
| 0.4 mmol/g isophthalic acid/0.5 mmol/g p-ethylbenzoate | 0.4 ISO/0.5 EB |
| 0.4 mmol/g isophthalic acid/0.3 mmol/g p-ethylbenzoate | 0.4 ISO/0.3 EB |
| 0.4 mmol/g isophthalic acid | 0.4 ISO |
| 0.3 mmol/g isophthalic acid/0.3 mmol/g p-ethylbenzoate | 0.3 ISO/0.3 EB |
| 0.5 mmol/g isophthalic acid/0.3 mmol/g p-butylbenzoate | 0.5 ISO/0.3 BB |
| 0.5 mmol/g isophthalic acid/0.5 mmol/g p-butylbenzoate | 0.5 ISO/0.5 BB |
| 0.4 mmol/g isophthalic acid/0.3 mmol/g p-butylbenzoate | 0.4 ISO/0.3 BB |
| 0.3 mmol/g isophthalic acid/0.3 mmol/g p-butylbenzoate | 0.3 ISO/0.3 BB |
| 0.3 mmol/g isophthalic acid | 0.3 ISO |

Bleed and waterfastness for these inks are shown below. Improvements in waterfastness can be seen for attachment of EB and BB by comparing waterfastness results (OD transferred) of the above pigments with those modified with 0.3 and 0.4 mmole/g isophthalic acid alone. The black-yellow bleed data indicates that improved bleed is attained at ratios of 0.3 ISO/0.3 EB, 0.3 ISO/0.3 BB, 0.5 ISO/0.5 EB and 0.5 ISO/0.5 BB.

| Pigment | 5-min waterfastness Gilbert Bond | 5-min waterfastness Champion Datacopy | Black-Yellow Bleed Champion Datacopy | Black-Yellow Bleed Union Camp Jamestown |
| --- | --- | --- | --- | --- |
| 0.5 ISO/0.5 EB | 0 | 13 | 7.7 | 6.2 |
| 0.5 ISO/0.3 EB | 7 | 27 | 14.5 | 10.9 |
| 0.5 ISO/0.5 BB | 1 | 0 | 8.0 | 5.8 |
| 0.5 ISO/0.3 BB | 4 | 1 | 11.0 | 8.1 |
| 0.4 ISO | 88 | 102 | | |
| 0.4 ISO/0.5 EB | 0 | 0 | 8.10 | 8.7 |
| 0.4 ISO/0.3 EB | 20 | 51 | 8.9 | 6.7 |
| 0.4 ISO/0.3 BB | 0 | 0 | 6.8 | 7.2 |
| 0.3 ISO | 0 | 17 | | |
| 0.3 ISO/0.3 EB | 1 | 0 | 5.0 | 4.6 |
| 0.3 ISO/0.3 BB | 3 | 0 | 5.7 | 5.8 |

INDUSTRIAL APPLICABILITY

The ink compositions of the invention are expected to find use in thermal or piezoelectric ink-jet inks, especially where the ink's characteristics, such as black to color bleed control and waterfastness are desired.

Thus, there has been disclosed an ink-jet ink which includes a colorant derived by treating the surface of colorant particles with specific functional groups thereon. It will be readily apparent to those skilled in this art that various changes and modifications of an obvious nature may be made, and all such changes and modifications are considered to fall within the scope of the invention.

What is claimed is:

1. An ink-jet ink for ink-jet printing which comprises:
   a vehicle and at least one macromolecular chromophore pigment wherein said pigment comprises a mixture of functional groups attached to the surface of said pigment to allow said pigment to be self-dispersing in water and impart bleed control and waterfastness characteristics to said pigment, wherein said functional groups which impart bleed control and waterfastness characteristics to said pigment is of the ester structure:

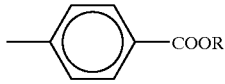

wherein R is from about 2 to about 4 carbon atoms; wherein said functional groups which allow said pigment to be self-dispersing in water has the formula:

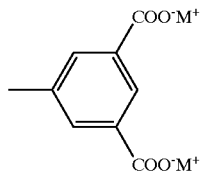

wherein $M^+$ is a counterion.

2. The ink-jet ink of claim 1 wherein R is selected from the group consisting of ethyl, n-propyl, n-butyl, isopropyl, isobutyl, t-butyl and mixtures thereof.

3. The ink-jet ink of claim 1 wherein the functional groups are attached based on a ratio of water dispersible functional group reactants:ester functional group reactants present in a starting ratio of from about 0.3/0.5 to about 0.5/0.3 mmol/g MMC colorant.

4. The ink-jet ink of claim 3 wherein the functional groups are attached based on a ratio of water dispersible functional group reactants:ester functional group reactants present in a starting ratio of about 0.5/0.5 mmol/g MMC colorant.

5. The ink-jet ink of claim 3 wherein the functional groups are attached based on a ratio of water dispersible functional group reactants:ester functional group reactants present in a starting ratio of about 0.3/0.3 mmol/g MMC colorant.

6. The ink-jet ink of claim 1 wherein said vehicle contains components selected from the group consisting of cosolvents, surfactants, amphiphiles, biocides, and mixtures thereof.

7. A method of ink-jet printing comprising printing on a medium with an ink comprising:
a vehicle and at least one macromolecular chromophore pigment wherein said pigment comprises a mixture of functional groups attached to the surface of said pigment to allow said pigment to be self-dispersing in water and impart bleed control and waterfastness characteristics to said pigment, wherein said functional groups which impart bleed control and waterfastness characteristics to said pigment is of the ester structure:

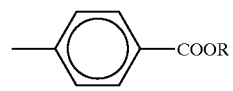

wherein R is from about 2 to about 4 carbon atoms; wherein said functional groups which allow said pigment to be self-dispersing in water has the formula:

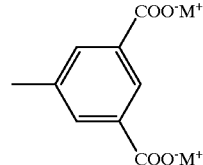

wherein $M^+$ is a counterion.

8. The method of claim 7 wherein R is selected from the group consisting of ethyl, n-propyl, n-butyl, isopropyl, isobutyl, t-butyl and mixtures thereof.

9. The method of claim 7 wherein the functional groups are attached based on a ratio of water dispersible functional group reactants:ester functional group reactants present in a starting ratio of from about 0.3/0.5 to about 0.5/0.3 mmol/g MMC colorant.

10. The method of claim 9 wherein the functional groups are attached based on a ratio of water dispersible functional group reactants:ester functional group reactants present in a starting ratio of about 0.5/0.5 mmol/g MMC colorant.

11. The method claim 9 wherein the functional groups are attached based on a ratio of water dispersible functional group reactants:ester functional group reactants present in a starting ratio of about 0.3/0.3 mmol/g MMC colorant.

12. The method of claim 7 wherein said vehicle contains components selected from the group consisting of cosolvents, surfactants, amphiphiles, biocides, and mixtures thereof.

* * * * *